W. B. COOK.
VEHICLE SPRING FASTENER.
APPLICATION FILED APR. 23, 1910.
977,934.
Patented Dec. 6, 1910.
2 SHEETS—SHEET 1.
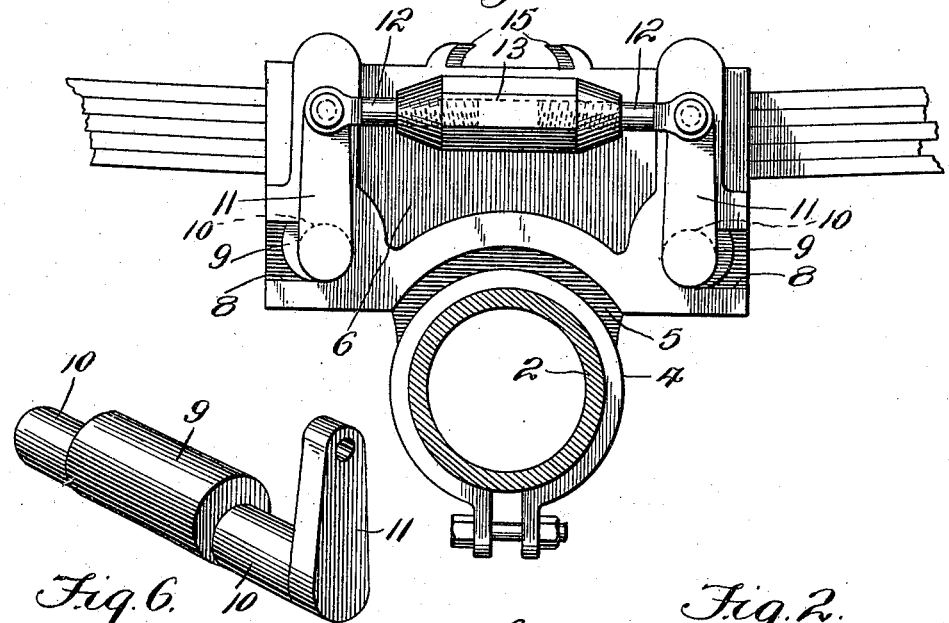
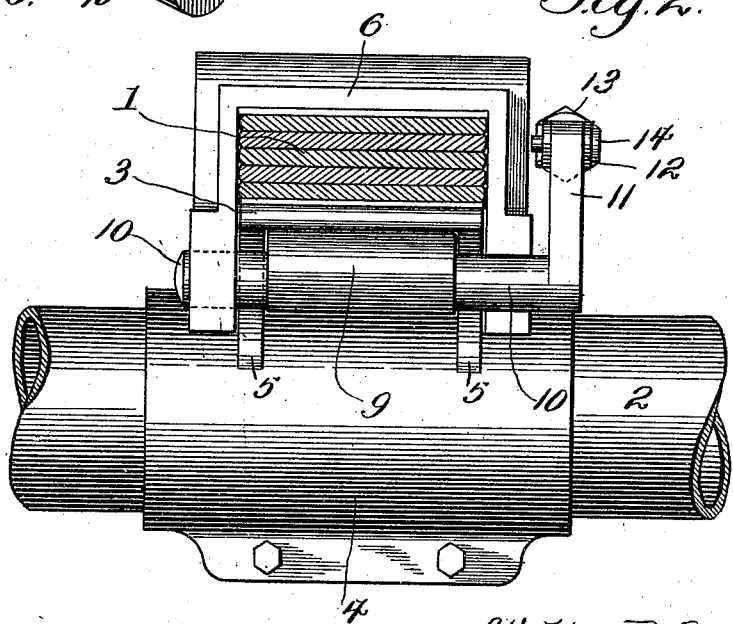
Witnesses
J. L. Wright,
U. B. Hillyard.
Inventor
Walter B. Cook,
By Victor J. Evans,
Attorney

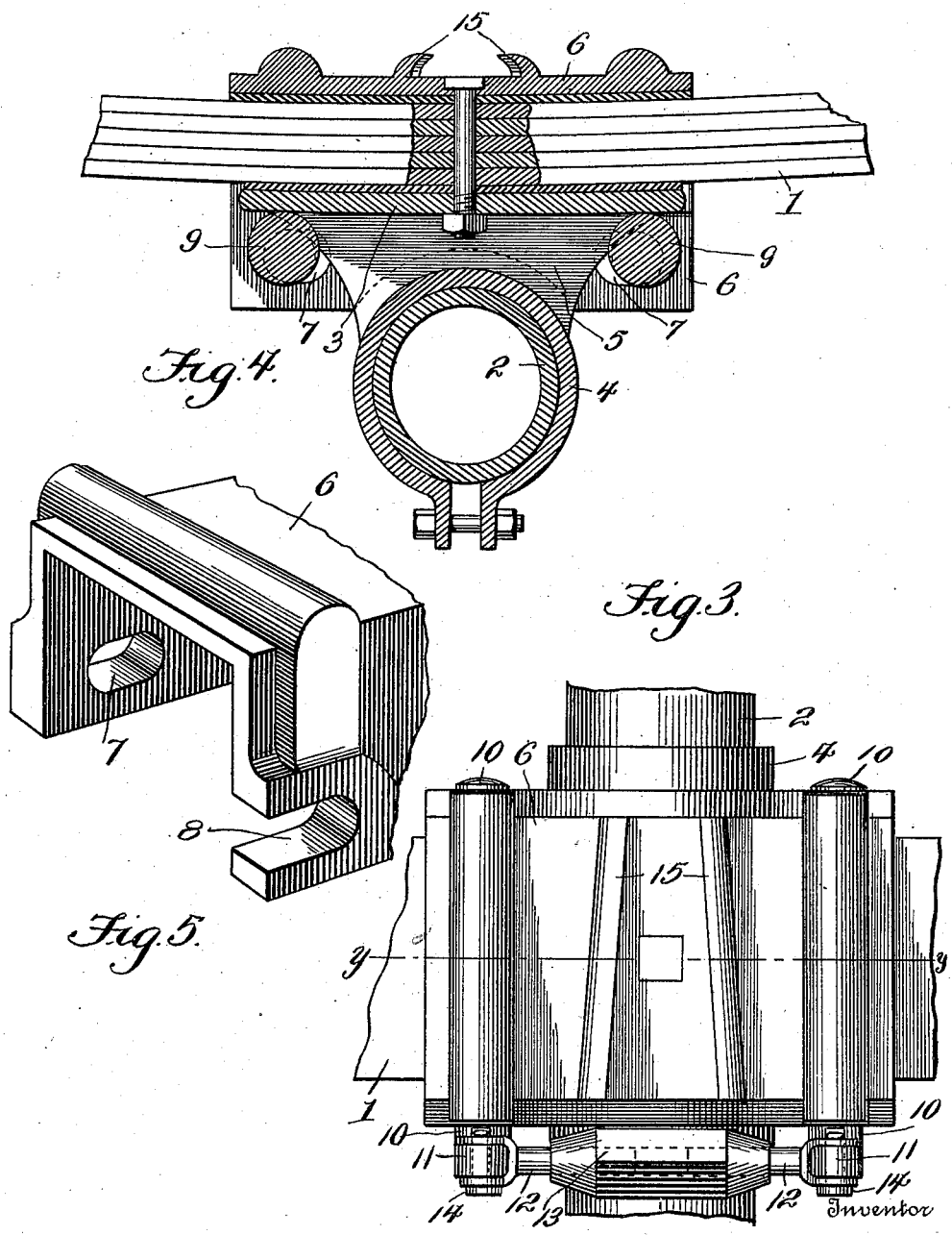

UNITED STATES PATENT OFFICE.

WALTER BERTRAM COOK, OF MEDICINE HAT, ALBERTA, CANADA.

VEHICLE-SPRING FASTENER.

977,934.  Specification of Letters Patent.  Patented Dec. 6, 1910.

Application filed April 23, 1910. Serial No. 557,291.

*To all whom it may concern:*

Be it known that I, WALTER B. COOK, a citizen of the United States, residing at Medicine Hat, in the Province of Alberta and Dominion of Canada, have invented new and useful Improvements in Vehicle-Spring Fasteners, of which the following is a specification.

The present invention provides means for securing vehicle springs either to the axle or to parts of the frame-work as may be required, the purpose being to provide for ready detachment of the spring when required for any purpose and to obtain an extended bearing upon the spring when the same is secured, thereby preventing fracture from jar or vibration.

The invention further aims to provide securing means of the character stated which involves a simple construction and which is durable and effective without entailing a cumbersome construction, the parts being so disposed as to admit of convenient manipulation both when tightening or loosening the spring and fastening means after the same have been assembled.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a side view of a fastening of the character described, showing the same in connection with a spring and an axle. Fig. 2 is an end view of the fastening, the spring being in section. Fig. 3 is a top plan view. Fig. 4 is a longitudinal section on the line *y—y* of Fig. 3. Fig. 5 is a detail perspective view of an end portion of the box or clip which is fitted to the spring. Fig. 6 is a perspective view of a cam lock bolt.

Corresponding and like parts are referred to in the following description, and indicated in all the views of the drawings, by the same reference characters.

The numeral 1 designates the vehicle spring, which comprises a number of leaves. The numeral 2 indicates an axle to which the spring 1 is connected. It is to be understood that while the spring is shown secured to an axle the fastening means may be employed in any relation for securing the spring to the part to which it is to be attached. Inasmuch as the fastening means are admirably adapted for automobile running gear they are shown in this connection in the drawings.

The seat 3 for the spring consists of a plate which is provided with a clamp 4, whereby it is secured to the axle 2. Longitudinal webs 5 connect the seat 3 with the clamp 4. The seat 3 consists of a plate of suitable length and width according to the specific adaptation for which the fastening is intended. It is preferred to form the seat 3, longitudinal webs 5 and clamp 4 of one piece, thereby obviating joints and insuring a substantial and light construction. The ends of the seat or plate 3 project so as to extend over the lock bolts.

The box or clip 6 is of substantially U-form in end view or cross section and may be of any length or width according to the size of the spring for which designed. The box or clip is reinforced at points subjected to the greatest strain so as to withstand the strains without entailing a cumbersome or heavy construction. The box or clip is open at its lower side and is designed to fit over the spring and seat 3, as indicated most clearly in Figs. 1 and 2. Openings 7 are formed in end portions of one side or wall of the box and open slots 8 are provided in the ends of the opposite side or wall. The openings 7 and slots 8 aline transversely and receive the journals at the ends of the cam lock bolts. The slots 8 open outward through the extremities of the side or wall of the box or clip in which they are formed and enable the cam lock bolts to be easily placed in position or removed. When the box or clip is in position it incloses three sides of the spring and the sides or webs 5 of the seat 3. The end portions of the sides of the box or clip provided with the openings 7 and open slots 8 project beyond the face of the webs 5 so as to provide ample clearance for the journals of the cam lock bolts, which latter come beneath the end portions of the seat 3 and serve to clamp the spring between said seat and the top of the box or clip.

The cam lock bolts are of like formation and each consists of a cam portion 9, journals 10 and an arm 11. The several parts are of integral formation. The cam portion 9 is of a length corresponding to the distance between the inner faces of the webs 5 so as to come between the latter and engage with the under side of the seat 3, as shown most clearly in Fig. 2. The journals 10 are of a length to extend across the ends of the webs 5 and obtain bearings in the openings 7 and slots 8. The cam lock bolts are placed so that their arms 11 come upon the same side of the box or clip, whereby they may be drawn together and secured by the same fastening means. When placing the cam lock bolts in position the journals remote from the arms 11 are inserted into the openings 7, after which the journals adjacent the arms 11 are caused to enter the open slots 8. When placing the cam lock bolts in position they are arranged with the arms 11 extending downward and after the cam lock bolts have been placed in position they are turned to throw the arms 11 upward, thereby bringing the cam portions 9 into forcible engagement with the projecting ends of the seat 3. The arms 11 are now connected by means of bolts 12 and a turn buckle 13, the outer ends of the bolts 12 being forked so as to embrace the arms 11 to which they are pivotally connected by means of pins 14, which are headed at one end and are pierced near the opposite end to receive cotter pins, thereby enabling the bolts 12 to be readily connected to or disconnected from the arms 11. The turn buckle 13 connects the inner ends of the bolts 12 in the manner well understood, said turn buckle serving to draw the bolts 12 and the upper ends of the arms 11 together and to hold said parts in the adjusted position. Bumpers may be fitted to the box or clip 6 in any way and for this purpose flanges 15 are provided upon the top of the box or clip.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. Means for securing a spring, the same comprising a seat upon which the spring is placed, a clip embracing the spring and seat, cam lock bolts mounted upon the clip and adapted to have their cam portions engage the seat, arms at one end of the cam lock bolts, and means for securing said arms after they have been moved to turn the cam lock bolts to draw the parts firmly together.

2. Securing means for a spring, the same comprising a seat upon which the spring is placed, a clip embracing the spring and seat, cam lock bolts journaled in the side members of the clip and having their cam portions in engagement with the seat, arms at one end of the cam lock bolts, bolts pivotally connected to the ends of said arms, and a turn buckle for drawing the bolts together and holding the same in an adjusted position.

3. Means for securing a spring, the same comprising a seat upon which the spring is placed, a clip embracing the spring and seat and having openings in one side and open ended slots in the opposite side, cam lock bolts mounted in the said openings and open ended slots of the clip and having their cam portions in engagement with end portions of the seat, arms at one end of the cam lock bolts, and connecting means for holding said arms in an adjusted position.

4. In fastening means of the character described, the combination of a seat provided with longitudinal webs and a clamp, a clip adapted to embrace opposite sides of the seat and having openings near the ends of one side and provided in the ends of its opposite side with outwardly opening slots, cam lock bolts mounted in the openings and slots of the clip and adapted to have their cam portions engage the ends of the said seat and to clear the longitudinal webs, arms at one end of the cam lock bolts, and means for connecting said arms and holding the same in an adjusted position.

5. Means for connecting a spring to a supporting part, said means comprising a seat having a clamp, a clip adapted to embrace the spring and seat and having openings near the ends of one side and open ended slots in the ends of the opposite side, cam lock bolts mounted in said openings and open ended slots of the clip, arms at one end of the cam lock bolts, bolts pivotally connected to the ends of said arms, and a turn buckle for connecting the said bolts.

In testimony whereof I affix my signature in presence of two witnesses.

WALTER BERTRAM COOK.

Witnesses:
H. O. KNOWLES,
A. E. HETHERINGTON.